UNITED STATES PATENT OFFICE.

ROBERT W. HOCHSTETTER, OF CINCINNATI, OHIO, ASSIGNOR TO THE AULT & WIBORG COMPANY, OF CINCINNATI, OHIO.

INK.

No. 928,450.   Specification of Letters Patent.   Patented July 20, 1909.

Application filed December 14, 1901, Serial No. 86,002. Renewed October 13, 1905. Serial No. 282,592.

*To all whom it may concern:*

Be it known that I, ROBERT W. HOCHSTETTER, a citizen of the United States, and a resident of Cincinnati, in the county of Hamilton and State of Ohio, have invented a certain new and useful Improvement in Ink, of which the following is a full, clear, and exact description.

My improvement relates to inks to be used on a mimeograph, or any machine of similar character.

The object of my invention is to produce an ink which will remain moist in the pad while at the same time it shall have the quality of drying rapidly on the paper, so that after each operation of the mimeograph, the printed sheets may fall one upon the other without danger of "smudging".

The difficulty with the inks at present in use is, that when a quick drying ink is used, so that the ink dries rapidly on the paper, such ink dries with equal rapidity in the pad and waxed stencil and clogs them, thus preventing a ready flow of ink through the pad and stencil. On the other hand, when a slowly drying ink is used, although it will not clog the pad and waxed stencil, and will freely flow through them, it dries so slowly on the paper that the printed sheets cannot be thrown immediately after each operation, one upon the other, because the ink being moist, will cause the sheets to "smudge".

Various inks have been tried to overcome the above difficulties. For example, a mimeograph ink consisting of thin printer's ink mixed with vaseline has been used with an ordinary hand mimeograph, but this ink cannot be used on an oscillating mimeograph for the reason that it will not draw evenly and continuously through the pad by means of capillary attraction, as is necessary in such a machine and will leave an oily outline to the letters on the paper. Again printer's ink has been mixed with an emulsion of glycerin and borax (borated gylcerin) or other alkaline agents and glycerin. This ink will draw through the pad but will dry too slowly on the paper.

My improved ink is especially adapted for use in an oscillating mimeograph or machine of similar character, in which the ink is drawn through the pad and through the waxed stencil by means of capillary attraction.

In the case of inorganic pigments, and carbon black pigments, in carrying out my invention, I grind the pigments in a mixture of glycerin and Turkey red oil. Ground with glycerin alone, the result is a fairly good quality of ink, but ground in a mixture of the two, I find that an ink is produced which not only flows easily and readily through the pad without clogging, but dries rapidly on the paper, thereby fulfilling all the requirements of an ink to be used on an oscillating mimeograph.

As a specific example of my improved ink I give the following proportions:—Take thirty parts by weight of dry barium sulfate, ten parts by weight of purple R. pigment on barium sulfate base, five parts purple B pigment on barium sulfate base, and twenty-six parts of glycerin, all the parts by weight. Grind all ingredients above mentioned together until perfectly free from grit. To the above add thirty-five and one half parts by weight, of Turkey red oil, and eighteen parts by weight of glycerin. This produces the ink. The body of the ink as described can readily be varied by either increasing the pigment or the varnish, as the case may require. As for example, for very warm climates, more pigment must be used: otherwise the resulting ink would be too thin.

The use of the Turkey red oil increases the rapidity with which the ink will dry upon the paper, it appearing to simply draw the ink right into the paper. With glycerin alone this would not be the case, its action being slower than that of the Turkey red oil. Turkey red oil is a sulfonated castor oil and its essential quality is that it will readily mix with glycerin and never separate from it or settle out on standing. Other sulfonated oils have this characteristic and may be used in place of the Turkey red oil. I therefore do not limit myself to the use of Turkey red oil alone.

Organic or lake pigments are usually constructed with alumina white as their base. So constructed, if ground with glycerin, an ink would be produced which could not be used on an oscillating mimeograph or machine of similar character, because it would soon become stiff and jelly-like on standing and could not then draw through the pad and stencil. This is due to the chemical reaction of the glycerin with the alumina white. I find however, that if barium sulfate is used as a base in constructing pigments from organic dyes (as for example purple green and red dyes) they may be ground with glycerin in making stencil inks without the above named objection. A fairly good quality of mimeograph ink is thus produced. I prefer however, to grind such pigments in a mixture of glycerin and Turkey red oil as described in the case of inorganic and carbon black pigments, and I find that in this way an ink is produced which has all the requisites of an ink for an oscillating mimeograph or device of a similar character.

In the case of organic pigments, I prefer to use in addition a little glucose, because the organic pigments are slightly soluble in the vehicle, which is the mixture of glycerin and Turkey red oil, thus causing the ink to spread on the paper and to produce what is technically known as "bleeding". The glucose prevents this to a great extent.

The essential quality of the barium sulfate which is used as the base of organic pigments in constructing them for use in the formation of my improved ink, is that it will not enter into a chemical reaction with glycerin. I therefore do not limit myself to the use of amorphous or precipitated barium sulfate alone as the base of pigments to be used in the formation of my improved ink. Any other suitable substance which will not combine with glycerin chemically as for example barites or china clay may be used in its place and as its equivalent.

By grinding any of the pigments above referred to with Turkey red oil or with any other sulfonated oil, alone, I am also enabled to get a fairly good quality of mimeograph ink.

Having thus described my invention, what I desire to claim as new and to cover by Letters Patent, is:—

1. An improved ink, consisting of a pigment ground in a mixture of glycerin and a sulfonated oil, substantially as specified.

2. An improved ink consisting of an organic pigment insoluble in glycerin, and whose base will not enter into a chemical reaction with glycerin, ground in glycerin, substantially as described.

3. An improved ink consisting of an organic pigment constructed on a base of barium sulfate, ground in glycerin, substantially as described.

4. An improved ink for use with waxed stencil sheets, consisting of an organic pigment, whose base will not enter into a chemical reaction with glycerin, ground in glycerin, substantially as described.

5. An improved ink consisting of a pigment ground in a mixture of glycerin and Turkey red oil, substantially as described.

6. An improved ink consisting of an organic pigment, constructed on a base which will not enter into a chemical reaction with glycerin, ground in a mixture of glycerin and a sulfonated oil, substantially as and for the purpose specified.

7. An improved ink consisting of a pigment, constructed on a base which will not enter into a chemical reaction with glycerin, ground in a mixture of glycerin and Turkey red oil, substantially as and for the purpose specified.

8. An improved ink consisting of an organic pigment, constructed on a base of barium sulfate ground in a mixture of glycerin and Turkey red oil, substantially as and for the purpose specified.

9. An improved ink consisting of an organic pigment, constructed on a base of barium sulfate, ground in a mixture of glycerin and Turkey red oil, and a small amount of glucose, substantially as and for the purpose specified.

10. An improved ink consisting of an organic pigment, constructed on a base which will not enter into a chemical reaction with glycerin, ground in a mixture of glycerin and sulfonated oil, and a small amount of glucose, substantially as and for the purpose specified.

ROBERT W. HOCHSTETTER.

Witnesses:
EDWARD HAAT,
GEORGE HEIDMAN.